US008954893B2

(12) United States Patent
Sayers et al.

(10) Patent No.: US 8,954,893 B2
(45) Date of Patent: Feb. 10, 2015

(54) VISUALLY REPRESENTING A HIERARCHY OF CATEGORY NODES

(75) Inventors: Craig Peter Sayers, Menlo Park, CA (US); Ignacio Zendejas, Los Angeles, CA (US); Rajan Lukose, Oakland, CA (US); Martin Scholz, San Francisco, CA (US); Shyamsundar Rajaram, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1150 days.

(21) Appl. No.: 12/614,193

(22) Filed: Nov. 6, 2009

(65) Prior Publication Data

US 2011/0113385 A1 May 12, 2011

(51) Int. Cl.
*G06F 3/048* (2013.01)
*G06F 17/30* (2006.01)
*G06F 3/00* (2006.01)

(52) U.S. Cl.
CPC ................. *G06F 17/30873* (2013.01)
USPC .................... 715/853; 715/854; 715/855

(58) Field of Classification Search
USPC ........................ 715/783, 853–855
See application file for complete search history.

(56) References Cited

U.S. PATENT DOCUMENTS

| | | | | | |
|---|---|---|---|---|---|
| 5,835,085 | A | * | 11/1998 | Eick et al. | 715/853 |
| 5,895,470 | A | * | 4/1999 | Pirolli et al. | 707/727 |
| 5,918,236 | A | * | 6/1999 | Wical | 715/209 |
| 5,924,090 | A | * | 7/1999 | Krellenstein | 1/1 |
| 5,963,208 | A | * | 10/1999 | Dolan et al. | 715/760 |
| 5,963,965 | A | * | 10/1999 | Vogel | 715/236 |
| 6,031,537 | A | * | 2/2000 | Hugh | 715/854 |
| 6,038,560 | A | * | 3/2000 | Wical | 1/1 |
| 6,076,088 | A | * | 6/2000 | Paik et al. | 1/1 |
| 6,144,962 | A | * | 11/2000 | Weinberg et al. | 1/1 |
| 6,154,213 | A | * | 11/2000 | Rennison et al. | 715/854 |
| 6,240,410 | B1 | * | 5/2001 | Wical | 1/1 |
| 6,285,999 | B1 | * | 9/2001 | Page | 1/1 |
| 6,295,514 | B1 | * | 9/2001 | Agrafiotis et al. | 703/12 |
| 6,307,573 | B1 | * | 10/2001 | Barros | 715/764 |
| 6,363,378 | B1 | * | 3/2002 | Conklin et al. | 1/1 |
| 6,373,484 | B1 | * | 4/2002 | Orell et al. | 345/420 |
| 6,377,287 | B1 | * | 4/2002 | Hao et al. | 715/853 |
| 6,434,556 | B1 | * | 8/2002 | Levin et al. | 1/1 |
| 6,510,406 | B1 | * | 1/2003 | Marchisio | 704/9 |
| 6,556,225 | B1 | * | 4/2003 | MacPhail | 715/848 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002.

(Continued)

*Primary Examiner* — Steven B Theriault (57) ABSTRACT

In a method of visually representing a hierarchy of category nodes that identify one or more concepts, accesses to documents are tracked and one or more concepts that are relevant to the accessed documents are determined. In addition, one or more category paths through the hierarchy of category nodes for the determined one or more concepts are determined and relevance levels for the category nodes with respect to the determined one or more concepts are determined based upon the generated one or more category paths. Moreover, a graph depicting a visual representation of the relevance levels determined for each of the category nodes in the hierarchy of category nodes is constructed.

16 Claims, 7 Drawing Sheets

(56) References Cited

U.S. PATENT DOCUMENTS

| | | | | |
|---|---|---|---|---|
| 6,571,249 | B1* | 5/2003 | Garrecht et al. | 1/1 |
| 6,574,632 | B2* | 6/2003 | Fox et al. | 1/1 |
| 6,583,794 | B1* | 6/2003 | Wattenberg | 715/708 |
| 6,628,313 | B1* | 9/2003 | Minakuchi et al. | 715/853 |
| 6,646,652 | B2* | 11/2003 | Card et al. | 345/645 |
| 6,675,159 | B1* | 1/2004 | Lin et al. | 1/1 |
| 6,704,729 | B1* | 3/2004 | Klein et al. | 1/1 |
| 6,775,659 | B2* | 8/2004 | Clifton-Bligh | 1/1 |
| 6,795,826 | B2* | 9/2004 | Flinn et al. | 1/1 |
| 6,839,680 | B1 | 1/2005 | Liu et al. | |
| 6,868,525 | B1* | 3/2005 | Szabo | 715/738 |
| 6,879,332 | B2* | 4/2005 | Decombe | 715/764 |
| 6,928,436 | B2* | 8/2005 | Baudel | 1/1 |
| 6,931,604 | B2* | 8/2005 | Lane | 715/853 |
| 6,944,830 | B2* | 9/2005 | Card et al. | 715/853 |
| 6,961,731 | B2* | 11/2005 | Holbrook | 1/1 |
| 6,976,020 | B2* | 12/2005 | Anthony et al. | 1/1 |
| 7,036,093 | B2* | 4/2006 | Decombe | 715/853 |
| 7,054,870 | B2* | 5/2006 | Holbrook | 1/1 |
| 7,106,329 | B1* | 9/2006 | Miller et al. | 345/440 |
| 7,113,954 | B2* | 9/2006 | Vogel | 707/737 |
| 7,224,362 | B2* | 5/2007 | Kincaid et al. | 345/440 |
| 7,251,637 | B1* | 7/2007 | Caid et al. | 706/15 |
| 7,257,593 | B2* | 8/2007 | Mazner et al. | 1/1 |
| 7,268,791 | B1* | 9/2007 | Jannink | 345/619 |
| 7,271,804 | B2* | 9/2007 | Evans | 345/440 |
| 7,281,002 | B2* | 10/2007 | Farrell | 1/1 |
| 7,290,223 | B2* | 10/2007 | Decombe | 715/853 |
| 7,292,243 | B1* | 11/2007 | Burke | 345/440 |
| 7,373,612 | B2* | 5/2008 | Risch et al. | 715/850 |
| 7,421,665 | B2* | 9/2008 | Molesky et al. | 715/854 |
| 7,424,484 | B2* | 9/2008 | Ma et al. | 1/1 |
| 7,475,072 | B1* | 1/2009 | Ershov | 1/1 |
| 7,493,315 | B2* | 2/2009 | Holbrook | 1/1 |
| 7,512,612 | B1* | 3/2009 | Akella et al. | 1/1 |
| 7,555,476 | B2* | 6/2009 | Holbrook | 1/1 |
| 7,565,627 | B2* | 7/2009 | Brill et al. | 715/854 |
| 7,694,212 | B2* | 4/2010 | Fikes et al. | 715/200 |
| 7,698,651 | B2* | 4/2010 | Cabanes et al. | 715/775 |
| 7,752,534 | B2* | 7/2010 | Blanchard et al. | 715/204 |
| 7,756,845 | B2* | 7/2010 | Madani et al. | 707/696 |
| 7,774,335 | B1* | 8/2010 | Scofield et al. | 707/709 |
| 7,853,552 | B2* | 12/2010 | Beringer et al. | 1/1 |
| 7,877,393 | B2* | 1/2011 | Green et al. | 707/749 |
| 7,912,849 | B2* | 3/2011 | Ohrn et al. | 707/761 |
| 7,949,629 | B2* | 5/2011 | Pollara | 707/602 |
| 8,001,152 | B1* | 8/2011 | Solan | 707/791 |
| 8,010,342 | B2* | 8/2011 | Uchimoto et al. | 704/9 |
| 8,024,324 | B2* | 9/2011 | Amitay et al. | 707/715 |
| 8,037,066 | B2* | 10/2011 | Majko | 707/734 |
| 8,082,511 | B2* | 12/2011 | Sobotka et al. | 715/758 |
| 8,112,715 | B2* | 2/2012 | Cragun et al. | 715/745 |
| 8,140,541 | B2* | 3/2012 | Koss | 707/748 |
| 8,150,382 | B2* | 4/2012 | Kim et al. | 455/418 |
| 8,156,131 | B2* | 4/2012 | Marsden et al. | 707/752 |
| 8,209,337 | B2* | 6/2012 | Park | 707/749 |
| 8,219,916 | B2* | 7/2012 | Bonforte et al. | 715/733 |
| 8,224,851 | B2* | 7/2012 | Banda et al. | 707/781 |
| 8,229,957 | B2* | 7/2012 | Gehrking et al. | 707/778 |
| 8,234,305 | B2* | 7/2012 | Seligmann et al. | 707/791 |
| 8,239,358 | B1* | 8/2012 | Soubbotin | 707/706 |
| 8,266,153 | B2* | 9/2012 | Hui et al. | 707/748 |
| 8,275,399 | B2* | 9/2012 | Karmarkar et al. | 455/466 |
| 8,280,783 | B2* | 10/2012 | Brownell et al. | 705/27.1 |
| 8,296,660 | B2* | 10/2012 | Macadaan et al. | 715/751 |
| 8,347,231 | B2* | 1/2013 | Stephens | 715/833 |
| 8,364,718 | B2* | 1/2013 | Kirby | 707/802 |
| 8,417,695 | B2* | 4/2013 | Zhong et al. | 707/723 |
| 8,438,487 | B1* | 5/2013 | Lin-Hendel | 715/739 |
| 8,520,002 | B2* | 8/2013 | Stambaugh | 345/441 |
| 2002/0022956 | A1* | 2/2002 | Ukrainczyk et al. | 704/9 |
| 2002/0055919 | A1* | 5/2002 | Mikheev | 707/3 |
| 2002/0078090 | A1* | 6/2002 | Hwang et al. | 707/513 |
| 2002/0107827 | A1* | 8/2002 | Benitez-Jimenez et al. | 706/59 |
| 2002/0129015 | A1* | 9/2002 | Caudill et al. | 707/6 |
| 2002/0154175 | A1* | 10/2002 | Abello et al. | 345/853 |
| 2003/0028495 | A1* | 2/2003 | Pallante | 705/78 |
| 2003/0028564 | A1* | 2/2003 | Sanfilippo | 707/513 |
| 2003/0050915 | A1* | 3/2003 | Allemang et al. | 707/1 |
| 2003/0069908 | A1* | 4/2003 | Anthony et al. | 707/513 |
| 2003/0085931 | A1* | 5/2003 | Card et al. | 345/853 |
| 2003/0101449 | A1 | 5/2003 | Bentolila et al. | |
| 2003/0115189 | A1* | 6/2003 | Srinivasa et al. | 707/3 |
| 2003/0167163 | A1* | 9/2003 | Glover et al. | 704/9 |
| 2003/0167324 | A1* | 9/2003 | Farnham et al. | 709/224 |
| 2003/0217335 | A1* | 11/2003 | Chung et al. | 715/514 |
| 2004/0090472 | A1* | 5/2004 | Risch et al. | 345/853 |
| 2004/0172600 | A1* | 9/2004 | Evans | 715/517 |
| 2004/0243938 | A1* | 12/2004 | Weise et al. | 715/526 |
| 2005/0108001 | A1* | 5/2005 | Aarskog | 704/10 |
| 2005/0114786 | A1* | 5/2005 | Decombe | 715/764 |
| 2005/0144158 | A1* | 6/2005 | Capper et al. | 707/3 |
| 2005/0154690 | A1* | 7/2005 | Nitta et al. | 706/46 |
| 2005/0171760 | A1* | 8/2005 | Tinkler | 704/10 |
| 2005/0182764 | A1* | 8/2005 | Evans | 707/5 |
| 2005/0220351 | A1* | 10/2005 | Vanderwende et al. | 382/229 |
| 2006/0047649 | A1* | 3/2006 | Liang | 707/4 |
| 2006/0053172 | A1* | 3/2006 | Gardner et al. | 707/203 |
| 2006/0053174 | A1* | 3/2006 | Gardner et al. | 707/203 |
| 2006/0074836 | A1* | 4/2006 | Gardner et al. | 706/60 |
| 2006/0106793 | A1* | 5/2006 | Liang | 707/5 |
| 2006/0143175 | A1* | 6/2006 | Ukrainczyk et al. | 707/6 |
| 2006/0242147 | A1* | 10/2006 | Gehrking et al. | 707/7 |
| 2007/0033221 | A1* | 2/2007 | Copperman et al. | 707/103 R |
| 2007/0078832 | A1* | 4/2007 | Ott et al. | 707/3 |
| 2007/0100824 | A1* | 5/2007 | Richardson et al. | 707/7 |
| 2007/0150487 | A1* | 6/2007 | Christian et al. | 707/100 |
| 2007/0174247 | A1* | 7/2007 | Xu et al. | 707/3 |
| 2008/0007556 | A1* | 1/2008 | Evans | 345/440 |
| 2008/0010615 | A1* | 1/2008 | Curtis et al. | 715/846 |
| 2008/0016071 | A1* | 1/2008 | Frieden | 707/7 |
| 2008/0033932 | A1* | 2/2008 | DeLong et al. | 707/5 |
| 2008/0059897 | A1* | 3/2008 | Dilorenzo | 715/764 |
| 2008/0104061 | A1* | 5/2008 | Rezaei | 707/5 |
| 2008/0126176 | A1 | 5/2008 | Iguchi | |
| 2008/0162275 | A1* | 7/2008 | Logan et al. | 705/12 |
| 2008/0231644 | A1* | 9/2008 | Lempel et al. | 345/689 |
| 2008/0243815 | A1* | 10/2008 | Chan et al. | 707/5 |
| 2008/0270380 | A1* | 10/2008 | Ohrn et al. | 707/5 |
| 2008/0282186 | A1* | 11/2008 | Basavaraju | 715/781 |
| 2008/0306913 | A1* | 12/2008 | Newman et al. | 707/3 |
| 2009/0006371 | A1* | 1/2009 | Denoue et al. | 707/5 |
| 2009/0037400 | A1* | 2/2009 | Cragun et al. | 707/5 |
| 2009/0119614 | A1* | 5/2009 | Tienvieri et al. | 715/786 |
| 2009/0125381 | A1* | 5/2009 | Delepet | 705/10 |
| 2009/0125382 | A1* | 5/2009 | Delepet | 705/10 |
| 2009/0144240 | A1* | 6/2009 | Singh et al. | 707/3 |
| 2009/0177957 | A1* | 7/2009 | Bouillet et al. | 715/230 |
| 2009/0182727 | A1* | 7/2009 | Majko | 707/5 |
| 2009/0281900 | A1* | 11/2009 | Rezaei et al. | 705/14.55 |
| 2009/0299725 | A1* | 12/2009 | Grigsby et al. | 704/2 |
| 2009/0300009 | A1* | 12/2009 | Rezaei et al. | 707/5 |
| 2010/0030552 | A1* | 2/2010 | Chen et al. | 704/9 |
| 2010/0114879 | A1* | 5/2010 | Zhong et al. | 707/723 |
| 2010/0131899 | A1* | 5/2010 | Hubert | 715/823 |
| 2010/0161631 | A1* | 6/2010 | Yu et al. | 707/758 |
| 2010/0229082 | A1* | 9/2010 | Karmarkar et al. | 715/205 |
| 2010/0235027 | A1* | 9/2010 | Sweeney et al. | 706/12 |
| 2010/0318892 | A1* | 12/2010 | Teevan et al. | 715/229 |
| 2011/0010307 | A1* | 1/2011 | Bates et al. | 705/347 |
| 2011/0173216 | A1* | 7/2011 | Newman et al. | 707/765 |
| 2011/0214050 | A1* | 9/2011 | Stambaugh | 715/234 |

OTHER PUBLICATIONS

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

(56) References Cited

OTHER PUBLICATIONS

Hongjun Lu et al: "Extending a Web Browser with Client-Side Mining," Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.
Shahabi et al.; "Yoda an Accurate and Scalable Web based Recommendation System?" University of Southern California, Los Angeles, Sep., 2001.
Claypool et al.; "Implicit Interest Indicators", 14. Worcester Polytechnic Institute, Worcester, Computer Science Department Worcester Polytechnic Institute Worcester, MA 01609, USA., 2001.
Shahabi et al.; "A Framework for Efficient and Anonymous Web Usage Mining Based on Client-Side Tracking", 15. University of Southern California, Los Angeles, 2002.
Chattertrap; Online http://www.chattertrap.com; Jul. 20, 2010.
HSNW: SRI defense technology spawns civilian application: published Jun. 29, 2010.
Anthony Ha: Facebook investor backs Chattertrap, a personal assistant for content, Jun. 28, 2010.
Janik, J. et al., "Wikipedia in action: Ontological Knowledge in Text Categorization",University of Georgia, Computer Science Department Technical report No. UGA-CS-TR-07-001.
Schonhofen, P. "Identifying document topics using the Wikipedia category network", Proceedings of the 2006 IEEE/ACM International Conference on Web Intelligence.
Medelyan, O. et al., "Topic Indexing with Wikipedia", Proc of Wikipedia and AI workshop at the AAAI-2008 Conference, 2008.
Milne, D. et al., "Learning to Link with Wikipedia", CIKM'08, Oct. 26-30, 2008, ACM 2008.
Gabrilovich, E. et al., "Overcoming the Brittleness Bottleneck usingWikipedia: Enhancing Text Categorization with Encyclopedic Knowledge", AAAI 2006.
Banerjee, S., "Boosting Inductive Transfer for Text Classification using Wikipedia", HP Laboratories, India, HPL-2008-42, Apr. 2008.
Medelyan, O. et al.,"Mining Meaning From Wikipedia", Sep. 2008.
Zemanta, http://www.zemanta.com/.
IndyCar description from Wikipedia, http://en.wikipedia.org/wiki/IndyCar, Jun. 2009.
Readability, http://code.google.com/p/arc90labs-readability/, Jun. 2009.
Banerjee, S. et al., "Clustering Short Texts using Wikipedia", HP Laboratories, India, HPL-2008-41, Apr. 2008.
Bederson, B. et al., "Ordered and Quantum Treemaps: Making Effective Use of 2D Space to Display Hierarchies" ,ACM Transactions on Graphics, Oct. 2002.
Chernov, S. et al., "Extracting Semantic Relationships between Wikipedia Categories", in 1st Workshop on Semantic Wikis:, Jun. 2006.
C. Harrison. Clusterball, http://www.chrisharrison.net/projects/clusterball/, Jun. 2009.
Mihalcea, R. et al., Wikify! linking documents to encyclopedic knowledge. In CIKM '07, Lisboa, Portugul, Nov. 2007. ACM.
F. Nyffenegger. WikiMindMap.http://www.wikimindmap.org/, Jun. 2009.
Syed, Z. S. et al., "Wikipedia as an Ontology for Describing Documents", in Proc. of the Second International Conference on Weblogs and Social Media. AAAI Press, Mar. 2008.
Thom, J. A. et al., Use of Wikipedia categories in entity ranking. In 12th Australasian Document Computing Symposium, Melborne, Australia, Dec. 2007.
Wang, P. et al., "Improving text classi cation by using encyclopedia knowledge", in ICDM '07: 2007.
Zesch, T. et al., "Analysis of the Wikipedia Category Graph for NLP Applications", (NAACL-HLT), 2007.
Clusters, http://infosthetics.com/archives/2007/06/clusterball_wikipedia_data_visualization.html.
Treemap, http://infosthetics.com/archives/2006/03/itunes_wikipedia_news_treemap_data_visualization.html.
Tagcloud, http://infosthetics.com/archives/2006/03/itunes_wikipedia_news_treemap_data_visualization.html.
Andrejko et al., (2007) "User Characteristics Acquisition from Logs with Semantics," in Kelemenová, A., Koláø, D., Meduna, A., Zendulka, J., eds.: ISIM '07: Information Systems and Formal Models, Slezská universita v Opavi, 2007, 8 pages.
Huang, A. et al., "Clustering Documents using aWikipedia-based Concept Representation", Proceedings of the 13th Pacific-Asia Conference on Advances in Knowledge Discovery and Data Mining, Apr. 27-30, 2009, Bangkok, Thailand.
Why Wubat? Website User Behavior & Analysis Tool, Wubat, Online, http://www.wubat.com/ (download date Aug. 12, 2010.).
Chris Harrison, http://www.chrisharrison.net/projects/wikiviz/index.html. (download date Oct. 29, 2009).
Mindmap, http://www.wikimindmap.org/ (download date Oct. 29, 2009).

\* cited by examiner

VISUALLY REPRESENTING A HIERARCHY OF CATEGORY NODES

CROSS-REFERENCE TO RELATED APPLICATION

The present application shares some common subject matter with co-pending and commonly assigned U.S. patent application Ser. No. 12/614,260, entitled "Determining At Least One Category Path for Identifying Input Text", filed on even date herewith, the disclosure of which is hereby incorporated by reference in its entirety.

BACKGROUND

A user's web browsing history is a rich data source representing a user's implicit and explicit interests and intentions, and of completed, recurring, and ongoing tasks of varying complexity and abstraction, and is thus a valuable resource. As the web continues to become ever more essential and the key tool for information seeking and retrieval, various web browsing mechanisms that organize a user's web browsing history have been introduced. These web browsing mechanisms range from mechanisms that organize a user's web browsing history using a simple chronological list to mechanisms that organize a user's web browsing history through visitation features, such as, uniform resource locator (URL) domain and visit count.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an example embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and apparatus for visually representing a hierarchy of predefined category nodes that identify one or more concepts. Also disclosed herein is a computer readable storage medium that contains a set of instructions for performing the method.

Through implementation of the method and apparatus discussed herein, the categories and concepts associated with a document access history may be visually represented, with the respective relevancies of the categories and concepts to the accessed documents. As such, "topics" rather than the actual documents that are included in the document access history may be revisited. In one regard, a user may have a richer interaction with the user's document access history as compared with conventional history tracking software.

Figure 1A:
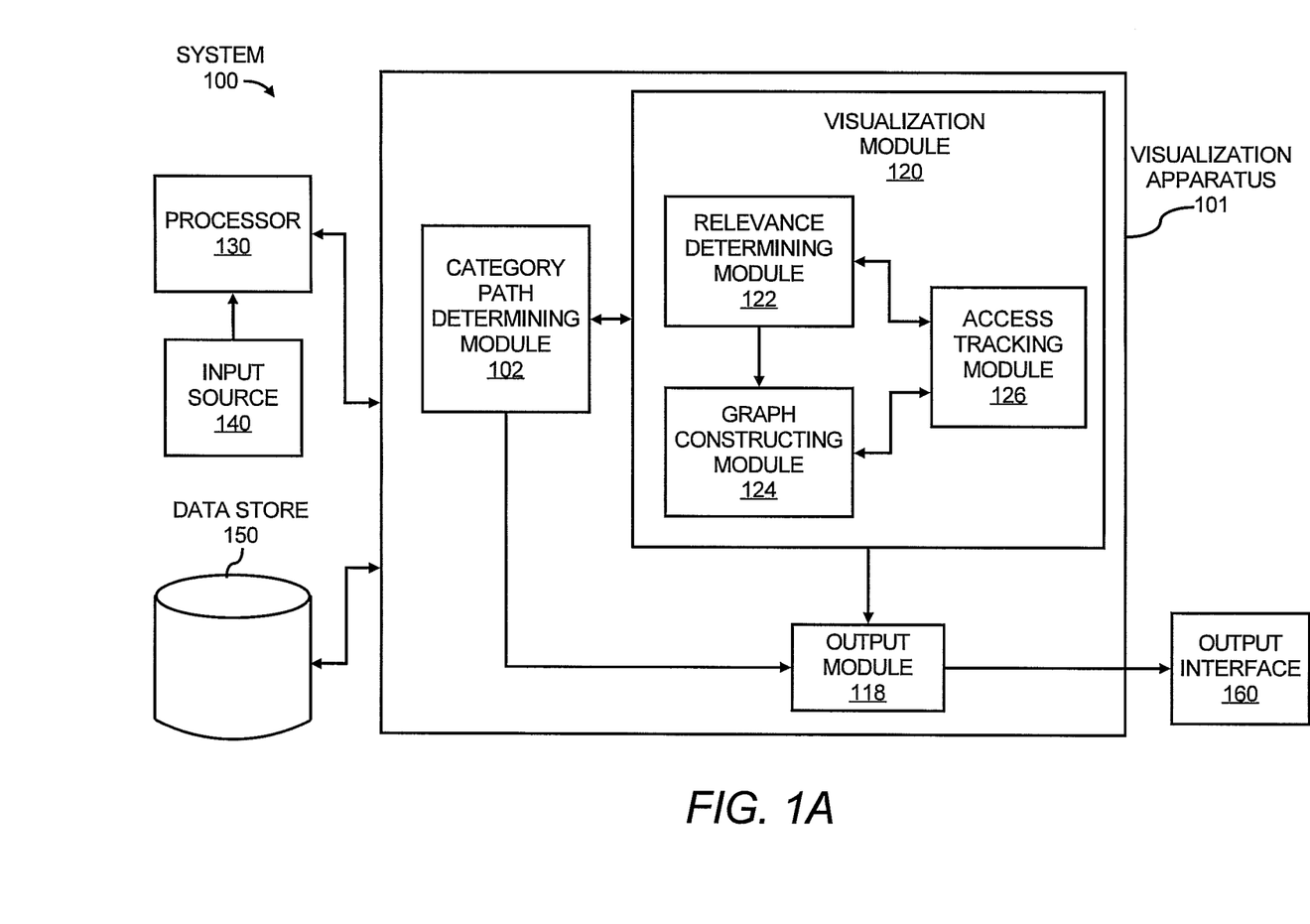
FIGS. 1A and 1B, respectively show simplified block diagrams of a system for visually representing a hierarchy of category nodes that identify one or more concepts, according to an example embodiments of the invention.

With reference first to FIG. 1A, there is shown a simplified block diagram of a system 100 for visually representing a hierarchy of category nodes that identify one or more concepts, according to an example. It should be understood that the system 100 may include additional components and that some of the components described herein may be removed and/or modified without departing from the scope of the system 100. For instance, the system 100 may include any number of additional applications or software configured to perform any number of other functions.

The system 100 comprises a computing device, such as, a personal computer, a laptop computer, a tablet computer, a personal digital assistant, a cellular telephone, etc., configured with a visualization apparatus 101, a processor 130, an input source 140, a message store 150, and an output interface 160. The processor 130, which may comprise a microprocessor, a micro-controller, an application specific integrated circuit (ASIC), and the like, is configured to perform various processing functions. One of the processing functions includes invoking or implementing the visualization apparatus 101, and more particularly, the modules of the visualization apparatus 101, as discussed in greater detail herein below.

Figure 1B:
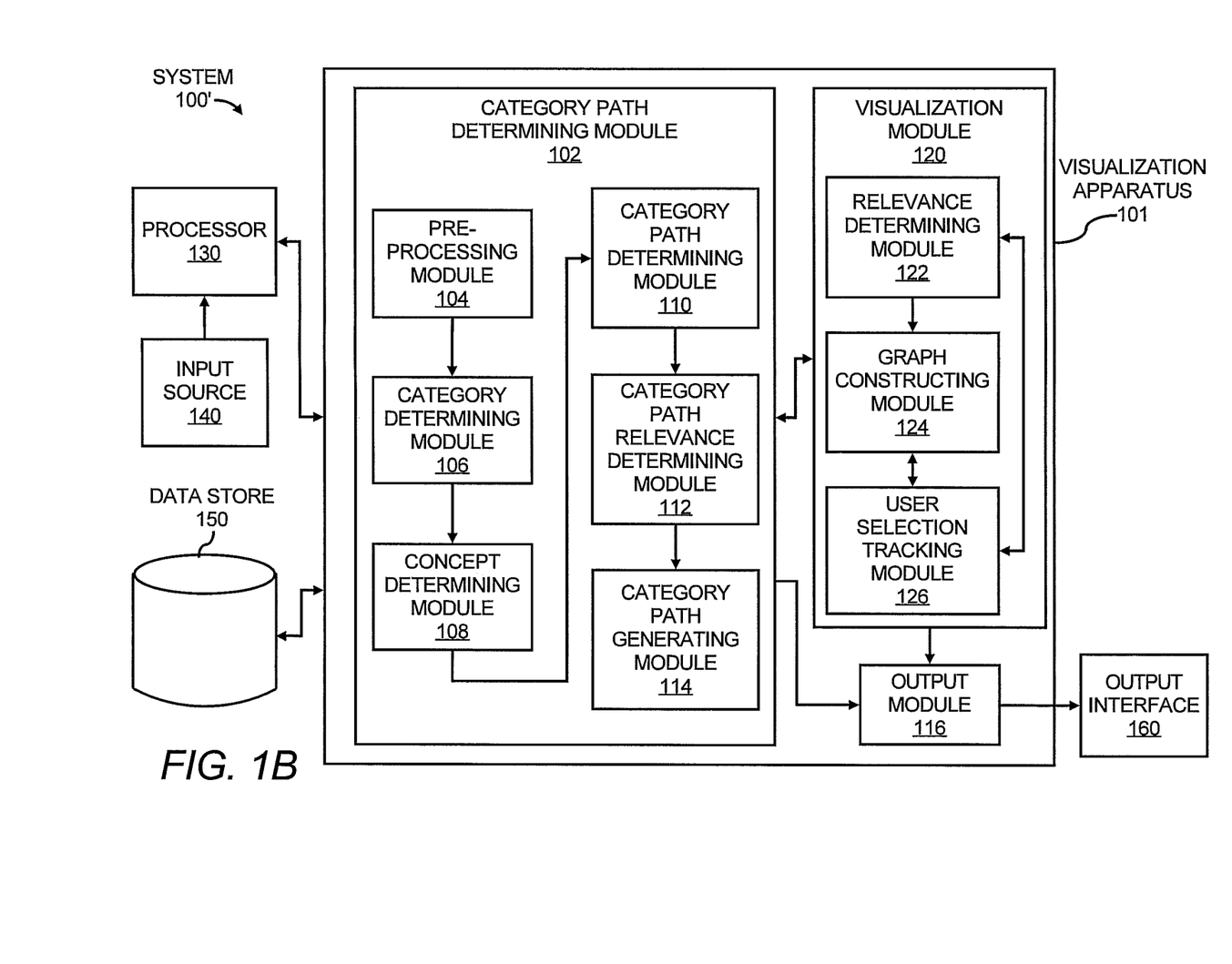

As shown in FIG. 1A, the visualization apparatus 101 includes a category path determining module 102, a visualization module 120, and an output module 116. The visualization module 120 is also depicted as including a relevance determining module 122, a graph constructing module 124, and an access tracking module 126. The category path generating module 102 may also include sub-modules as depicted in FIG. 1B, which is described in greater detail herein below. In any regard, it should be understood that the category path determining apparatus 102 and the visualization module 120 may comprise additional modules and that one or more of the modules contained in the visualization apparatus 101 may be removed and/or modified without departing from a scope of the visualization apparatus 101. For instance, one or more of the functions described with respect to particular ones of the modules 102 and 120, and the sub-modules contained therein, may be combined into one or more of another module.

According to an example, the visualization apparatus 101 comprises a hardware device, such as, a circuit or multiple circuits arranged on a board. In this example, the modules 102, 116, and 120 and the sub-modules contained therein, comprise circuit components or individual circuits. According to another example, the visualization apparatus 101 comprises software stored, for instance, in a volatile or non-volatile memory, such as dynamic random access memory (DRAM), electrically erasable programmable read-only memory (EEPROM), magnetoresistive random access memory (MRAM), flash memory, floppy disk, a compact disc read only memory (CD-ROM), a digital video disc read only memory (DVD-ROM) or other optical or magnetic media, and the like. In this example, the modules 102, 116, and 120 and the sub-modules contained therein, comprise software modules stored in the memory. According to a further example, the visualization apparatus 101 comprises a combination of hardware and software modules.

The visualization apparatus 101 may comprise a plug-in to a browser application, such as, a web browser, which allows access to webpages over an extranet, such as, the Internet or a file browser, which enables the user to browse through files stored locally on the user's visualization system 100 or through files stored externally, for instance, on a shared server. In addition, or alternatively, the visualization apparatus 101 may comprise a plug-in to a messaging application, which comprises any reasonably suitable application that enables communication over a network, such as, an intranet, the Internet, etc., through the system 100, for instance, an e-mail application, a chat messaging application, a text messaging application, etc. As a yet further example, the visualization apparatus 101 may comprise a standalone apparatus configured to interact with a messaging application, a browser application, or another type of application.

Generally speaking, the category path determining apparatus 102 is configured to receive as input, input text from a document, which may comprise a scanned document, a webpage (i.e., a hyper text markup language formatted, an extensible markup language (XML) formatted document, etc., document), a magazine article, an email message, a text message, a newspaper article, a handwritten note, an entry in a database, etc., and to automatically determine a category path that identifies the input text through use of machine-readable labels. In cases where the input text has already been labeled with a category path, then the category path determining apparatus 102 may simply look up and use that category path. For example, a category path may be encoded within a metadata tag within a web page. In cases where the input text is not already labeled, the category path determining apparatus 102 is configured to access and employ a labeled text data source in determining suitable categories for the input text and in determining the one or more category paths through a hierarchy of category nodes.

The labeled text data source may comprise a third-party database of articles, such as, Wikipedia™, Freebase™, IMDB™, and the like. The articles contained in the labeled text data sources are often assigned to one or more categories and sub-categories associated with the particular labeled text data sources. For instance, in the Wikipedia™ database, each of the articles is assigned a particular concept and there is a single article for each concept. In addition, the concepts are assigned to particular categories and sub-categories defined by the editors of the Wikipedia™ database. As discussed in greater detail herein below, the concepts and categories used in a labeled text data source, such as the Wikipedia™ database, may be leveraged in generating the one or more category paths to identify an input text.

A user may interface with the visualization apparatus 101 through the input source 140, which may comprise an interface device, such as, a keyboard, mouse, or other input device, to input the input text into the category path determining apparatus 102 or to direct the category path determining apparatus 102 to one or more documents of interest. A user may also use the input source 140 to instruct the category path determining module 102 to generate the at least one category path to identify a desired input text, which may include an entire document, to which the category path determining module 102 has access. In addition, a user may also use the input source 140 to navigate through one or more category paths determined for the input text. Furthermore, a user may use the input source 140 to select various elements, such as, category nodes, concepts, etc., to navigate through a displayed set of category paths and concepts, as discussed in greater detail herein below.

According to an embodiment, the category path determining apparatus 102 is configured to determine the one or more category paths for the selected input text through a hierarchy of category nodes from a weighted list of concept paths retrieved from one or more of the labeled text data sources. In this embodiment, the category path determining apparatus 102 may operate to communicate with the one or more labeled text data sources to retrieve the weighted list of category paths from the one or more labeled text data sources.

According to another embodiment, the category path determining apparatus 102 is configured to determine the one or more category paths for the selected input text by processing the input text and information contained in the labeled text data sources. A more detailed discussion of an example of this embodiment is discussed in greater detail in U.S. patent application Ser. No. 12/614,260. In addition, FIG. 1B depicts a block diagram of the system 100' of this embodiment, in which, the category path determining module 102 is depicted as including a pre-processing module 104, a category determining module 106, a concept determining module 108, a category path determining module 110, a category path relevance determining module 112, and a category path generating module 114. As discussed in that application for patent, the category path determining module 102 is configured to determining the one or more category paths based on the determined relevance of one or more concepts in the labeled text data source to the input text.

As also discussed in that application for patent, some or all of the predefined category hierarchy may be manually defined. The category levels that are not manually defined may be computed from categorical information contained in the labeled text data source. Thus, for instance, a user may define a root node and one or more child nodes and may rely on the category levels contained in the labeled text data source for the remaining child nodes in the hierarchy of predefined category levels. According to a particular embodiment, a user may define the hierarchy of predefined category levels as a tree structure and may map the categories of the labeled text data source into the tree structure. According to another embodiment, the pre-processing module 104 may be configured to automatically map concepts from the labeled text data source into the hierarchy of predefined category levels. According to an additional embodiment, the relevance of each concept to each category may be recorded as the probability that another article that mentions that concept would appear in that category. According to yet another embodiment, categories may further be labeled as being useful for disambiguating concepts (see below) or as useful for display to an end user.

The category path determining apparatus 102 may output the determined at least one category path for identifying the input text through the output interface 160. The output interface 160 may provide an interface between the category path determining apparatus 102 and another component of the system 100, such as, the data store 150, upon which the determined at least one category path may be stored. In addition, or alternatively, the output interface 160 may provide an interface between the category path determining apparatus 102 and an external device, such as a display, a network connection, etc., such that the at least one category path may be communicated externally to the category path determining apparatus 102.

Various manners in which the modules 104-116 of the category path determining module 102 may operate in generating the category path of an input text to enable the input text to be identified by a computing device is further discussed in the U.S. patent application Ser. No. 12/614,260.

As further shown in FIG. 1A, the visualization module 120 includes a relevance determining module 122, a graph constructing module 124, and an access tracking module 126. Generally speaking, modules 122-126 of the visualization module 120 are configured to determine one or more visual characteristics to be applied to the category nodes and the concepts and to generate a graph containing the category nodes and the concepts with the one or more determined visual characteristics. More particularly, the modules 122-126 are configured to determine the one or more visual characteristics of the category nodes and the concepts based upon one or more factors pertaining to the category nodes and/or the concepts, as discussed in greater detail herein below.

The modules 122-126 are further configured to construct and modify a graph that contains the hierarchy of category nodes and concepts. The modules 122-126 are configured to construct the graph to include the one or more determined visual characteristics. In addition, the output module 116 is configured to output the graph through the output interface 160, which may interface with a display on which the graph is displayed.

Figure 2:
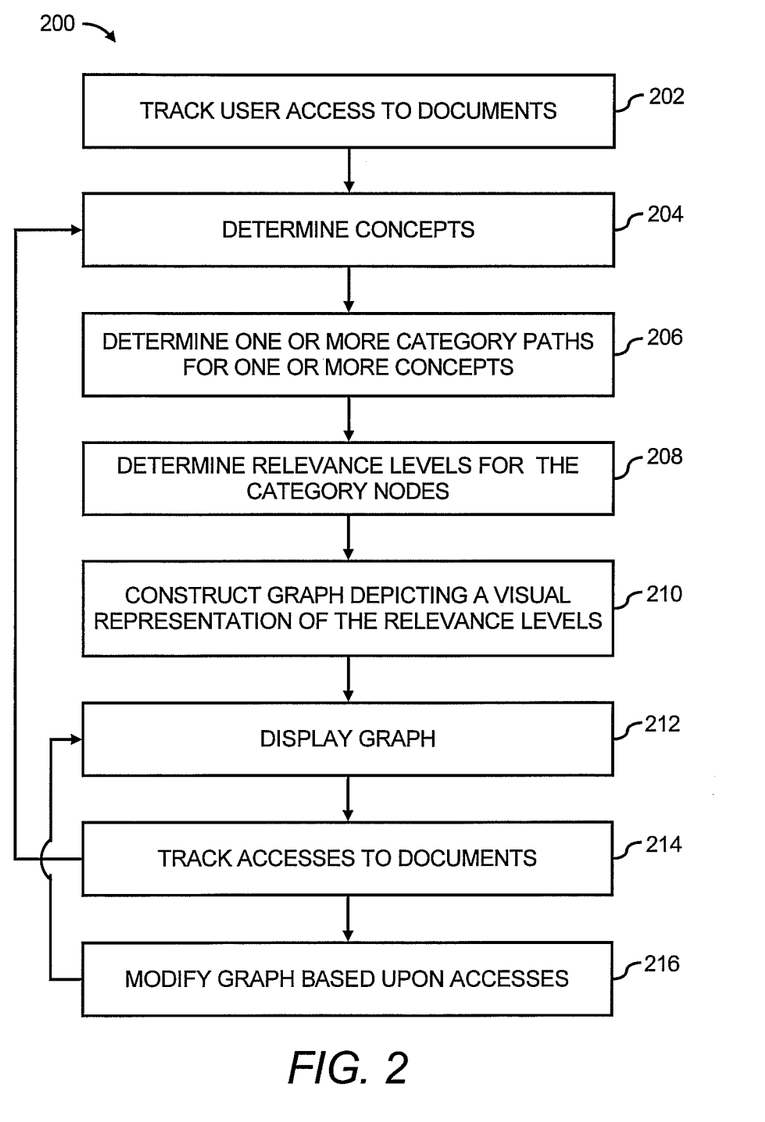
FIG. 2 depicts a method of visually representing a hierarchy of category nodes that identify one or more concepts, according to an example embodiment of the invention.

Various manners in which the modules 102 and 120 of the visualization apparatus 101 may operate in visually representing a hierarchy of category nodes that identify one or more selected concepts is discussed with respect to the method 200 depicted in FIG. 2. FIG. 2, more particularly depicts a method 200 of visually representing a hierarchy of category nodes that identify one or more concepts, according to an example. It should be apparent to those of ordinary skill in the art that the method discussed below with respect to FIG. 2 represents a generalized illustration and that other steps may be added or existing steps may be removed, modified or rearranged without departing from a scope of the method 200. Although particular reference is made to the system 100, 100' depicted in FIGS. 1A and 1B as performing the steps outlined in the method 200, it should be understood that the method 200 may be performed by a differently configured system without departing from a scope of the method 200.

At step 202, accesses to documents are tracked, for instance, by the visualization apparatus 101. Thus, for instance, the visualization apparatus 101 may track the webpages that a user accesses, the emails that are sent to and/or received by the user, word processing documents that are accessed by the user, etc. The documents may also comprise text messages, news articles and publications, etc.

At step 204, concepts to which the documents are determined to be relevant are determined, for instance, by the visualization apparatus 101. As discussed above, each of the concepts may correspond to a machine-readable label assigned to an article in a labeled text data source, such as Wikipedia™, Freebase™, IMDB™, and the like. According to an embodiment, the concept determining module 108 is configured to determine the concepts for the accessed documents as discussed in greater detail herein below with respect to step 308 in FIG. 3 and in U.S. patent application Ser. No. 12/614,260.

At step 206, one or more category paths are determined through a hierarchy of category nodes for one or more concepts, for instance, by the category path determining module 102. Various manners in which the one or more category paths may be generated are discussed in greater detail herein below with respect to step 310 in the method 300.

Figure 3:
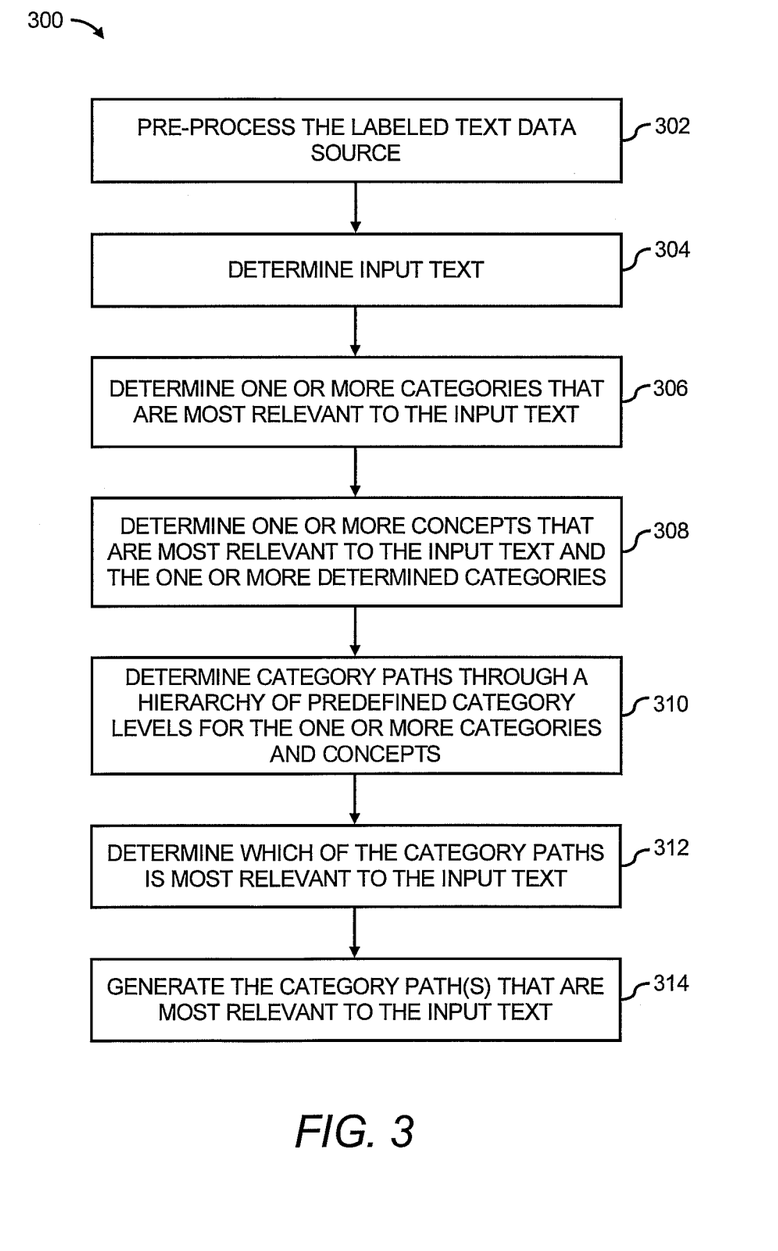
FIG. 3 depicts a flow diagram of a method of determining at least one category path for identifying an input text, according to an example embodiment of the invention.

FIG. 3, more particularly, depicts a flow diagram of a method 300 of determining at least one category path for identifying an input text, in which the at least one category path runs through a hierarchy of category levels, according to an example. It should be apparent to those of ordinary skill in the art that the method discussed below with respect to FIG. 3 represents a generalized illustration and that other steps may be added or existing steps may be removed, modified or rearranged without departing from a scope of the method 300. Additional details pertaining to the steps contained in the method 300 may be found in U.S. patent application Ser. No. 12/614,260.

At step 302, the labeled text data source is pre-processed, for instance, by the pre-processing module 104. By way of a particular example, the pre-processing module 104 is configured to analyze the labeled text data source corpus, finding categories for each concept by mapping the labeled text data source categories into a category graph (such as, a manually constructed category tree, finding phrases related to each category by using the text of articles assigned to concepts in each category, finding phrases related to each concept by using the text anchor tags which point to that concept, and evaluating counts of occurrences to determine the probability that an occurrence of a particular phrase indicates the text is relevant to a particular category or a particular concept. In this way, the pre-processing module 104 creates dictionaries of probabilities that map concepts to categories, map anchor tags to categories, and map anchor tags to concepts. As discussed below, these dictionaries are used by the category determining module 106, the concept determining module 108, and the category path determining module 110.

At step 304, an input text is determined, for instance, by the category path determining apparatus 102. The category path determining apparatus 102 may determine the input text, for instance, through receipt of instructions from a user to initiate the method 220 on specified input text, which may include part of or an entire document. The category path determining apparatus 102 may also automatically determine the input text, for instance, as part of an algorithm configured to be executed as a user is browsing through one or more documents, or as part of an algorithm to send or receive textual content.

At step 306, one or more categories are determined from the category hierarchy that are most relevant to the input text, for instance, by the category determining module 106. The category determining module 106 may compare the input text with the text contained in a plurality of articles in the labeled text data source to determine which of the plurality of categories is most relevant to the input text. According to a particular example, category determining module 106 is configured to make this determination by looking up phrases from the input text in the dictionaries constructed by the pre-processing module 104 and then computing a probability for each category using the probabilities for each category given the presence of each matching phrase.

At step 308, one or more concepts are determined from the labeled text data source that are most relevant to the input text using the input text, information from the labeled data source, and the categories determined at step 306, for instance, by the concept determining module 108. The concept determining module 108 may compare the input text with the text contained in a plurality of articles in the labeled text data source to determine which of the plurality of concepts may plausibly be relevant to the input text. According to a particular example, the concept determining module 108 makes this determination by searching for phrases from the input text in the dictionaries constructed by the pre-processing module 104 and then computing a probability for each concept using the probabilities for each concept given the presence of each matching phrase and the category probabilities computed at step 226.

At step 310 category paths through the hierarchy of pre-defined category levels for the one or more plausible categories are determining for the input text determined at step 226 which terminate at any of the plausible concepts for the input text determined at step 228, for instance, by the category path determining module 112.

At step 312, a determination as to which of the plausible category paths are most relevant to the input text is made, for instance by the category path relevance determining module 114. According to an embodiment, the category path relevance determining module 114 computes metrics for each of the plurality of plausible category paths, in which the metrics are designed to identify a relevance level for each of the category paths with respect to the input text. For instance, the category path relevance determining module 114 weights each of the categories in the plausible category paths based upon the relevance of each of those categories to the input text. In one embodiment, relevance is measured by using the probabilities computed for each category by the category determining module 106, the probabilities for each concept computed by the concept determining module 108, and the prior probabilities computed by the pre-processing module 104.

At step 314, at least one category path for the one or more concepts determined to be the most relevant to the input text is generated, for instance, by the category path generating module 114. According to an example, the category path generating module 114 may generate a plurality of category paths through different categories to define the input text. In addition, the category path determining apparatus 102 may output the at least one category path generated for the input text through the output interface 160, as discussed above.

With reference back to FIG. 2, at step 208, the relevance levels for the category nodes in the hierarchy of category nodes with respect to the one or more determined concepts are determined based upon the generated one or more category paths, for instance, by the relevance determining module 122. More particularly, for instance, the relevance determining module 122 may determine the relevance of each of the category nodes based upon the number of category paths in which the category nodes are included for the one or more determined concepts. Thus, for instance, those category nodes contained in a relatively large number of category paths may be considered to have a higher relevance level as compared with category nodes contained in a relatively fewer number of category paths. In addition or alternatively, the relevance determining module 122 may determine the relevance of each of the category nodes based upon the weights assigned to the category paths in which the category nodes are included for the one or more determined concepts. Thus, for instance, those category nodes contained in relatively highly weighted category paths may be considered to have relatively higher relevance levels as compared to those category nodes that are contained in relatively lower weighted category paths.

By way of a particular example, the relevance determining module 122 is configured to employ a scoring system for each of the category nodes, in which the scores assigned to the category nodes are a measure of their respective relevance levels with respect to the one or more concepts. In this example, the relevance determining module 122 is configured to set each of the category nodes to an initial predetermined score prior to assigning scores to each of the category nodes. For instance, the relevance determining module 122 may set each of the category nodes to have an initial value of 0. In addition, the relevance determining module 122 may increase the score of each of the category nodes based on the weighting assigned to each category path passing through that node. Thus, for instance, the category nodes contained in category paths having relatively higher weighting are assigned higher scores and are thus considered to have a higher relevance level to the one or more determined concepts then the category nodes having lower scores.

At step 210, the graph constructing module 124 constructs a graph that depicts a visual representation of the relevance levels determined for each of the category nodes in the hierarchy of category nodes. The relevance levels for the category nodes with respect to the one or more determined concepts may be visually represented through use of one or more graphical characteristics. By way of example, the graphical characteristics comprise one or more of font sizes, font colors, borders, bold-facing, underlining, different colors, shading, physical location, transparency, etc. The graphical characteristics may also include one or more of symbols, graphs, charts, etc., that may be placed adjacent to or in place of the text of the category nodes.

Figure 4A:
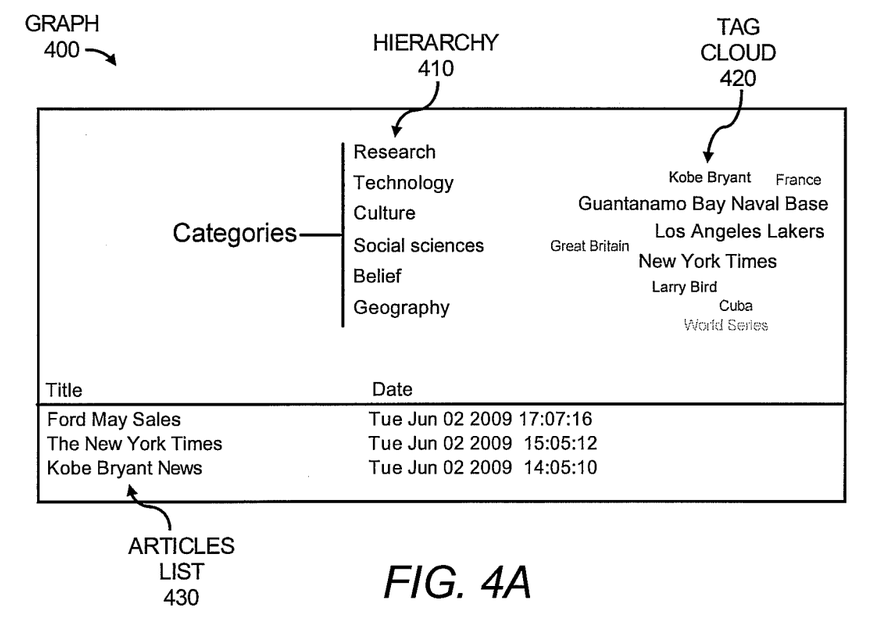
FIGS. 4A-4C, respectively depict graphs constructed by a graph constructing module, according to an example embodiment of the invention.
Figure 4B:
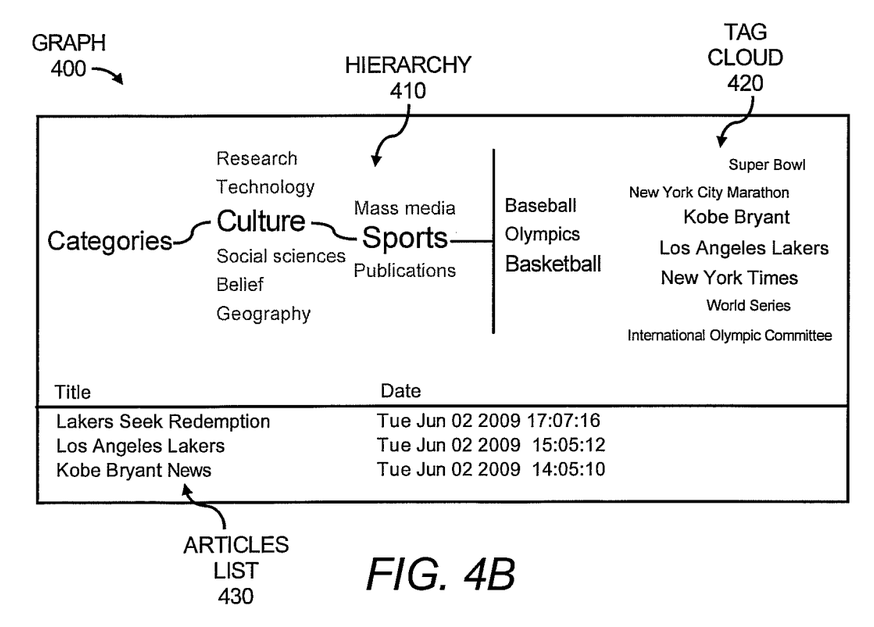
Figure 4C:
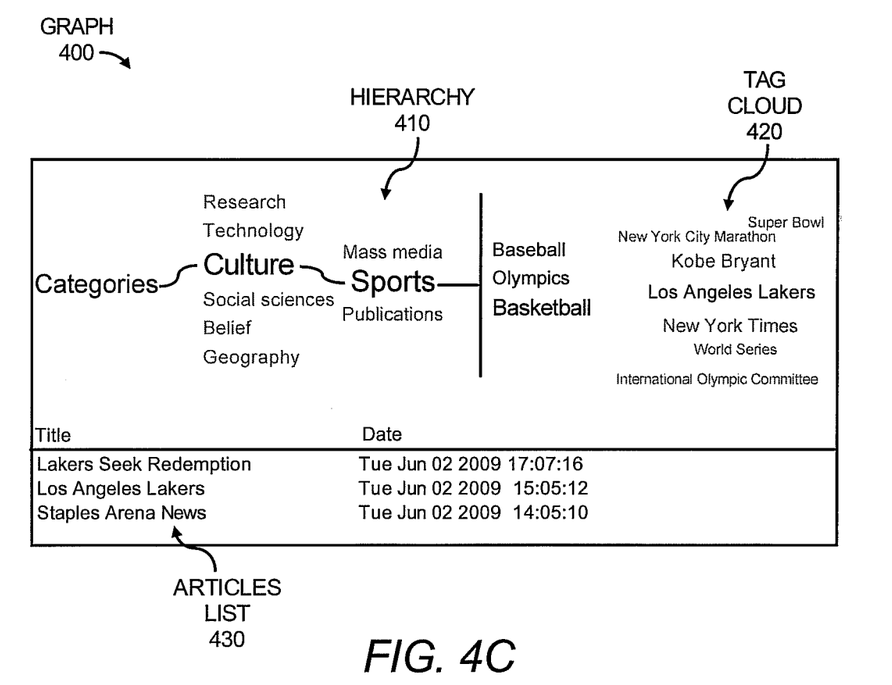

An example of a graph 400 constructed by the graph constructing module 124 is depicted in FIGS. 4A-4C. FIGS. 4A-4C also show changes to the graph 400 as different category nodes and/or concepts are selected. It should be clearly understood that the graphs 400 depicted in FIGS. 4A-4C are merely an illustrative example of a possible manner in which a hierarchy of category nodes and concepts may be displayed and manipulated. As such, the graph constructing module 124 may construct a graph that has a different appearance from that depicted in FIGS. 4A-4C without departing from a scope of the invention.

With reference first to FIG. 4A, the graph 400 is shown as including the hierarchy of category nodes 410, a tag cloud 420 containing the one or more selected concepts, and an articles list 430. In the graph 400, the root node of the hierarchy 410 is the top level category node, in this instance, the term "Categories". In addition, a first level of category nodes is also depicted in FIG. 4A. The category node labeled "Culture" is depicted as having a graphical characteristic that substantially distinguishes it from the other category nodes. More particularly, the "Culture" category node is depicted as having a larger font size as compared with the other category nodes.

As such, the "Culture" category node may have a higher relevance level as compared to the other category nodes contained in a particular hierarchy level. Thus, for instance, the category paths generated for a large number of (and/or the most recently accessed ones of) the accessed documents may include the "Culture" category node, which may have caused the relevance level of that category node be determined to be relatively high.

The tag cloud 420 is depicted as including a plurality of concepts determined at step 204 and the concepts in the tag cloud 420 are depicted as having one or more of various graphical characteristics, which may include, for instance, font sizes, font types, shading characteristics, placements in the tag cloud 420, colors, underlining, bolding, italicizing, etc. The various graphical characteristics of the concepts generally signify the relevance of the particular concepts to the selected category node. The relevance may be based upon one or more factors including the number of documents that the user has accessed corresponding to the concept, the time in which the user accessed a document corresponding to the concept, etc. The inclusion of and the various graphical characteristics of the concepts may thus vary depending upon the category node selected.

Also depicted in the graph 400 is a list of articles 430 that correspond to the concepts listed in the tag cloud 420. According to an example, the articles may be arranged in the articles list 430 based upon the chronological order in which the documents corresponding to the concepts contained in the tag cloud 420 have been accessed. Thus, the most recently visited webpages, for instance, may appear at the highest level in the articles list 430. In addition, the articles list 430 may include additional articles not shown at a particular time and the articles list 430 may be scrolled to find the additional articles.

Moreover, the list of articles 430 may contain a list of articles that the user has not previously visited, but may be considered to be relevant to the concepts contained in the tag cloud 420. For instance, articles relevant to the concepts contained in the tag cloud 420 that have recently been published may be identified, for instance, through key word matching, and displayed in the articles list 430.

At step 212, the visualization module 120 may output a constructed graph through the output module 116, to thereby cause the constructed graph to be displayed. In addition, at step 214, the visualization apparatus 101 tracks accesses with respect to at least one of the graph and documents. More particularly, the visualization apparatus 101 tracks when the one of the category nodes or lower-level category nodes has been selected. In addition or alternatively, the visualization apparatus 101 tracks when the a concept in the tag cloud 420 or an article listed in the articles list 430 have been selected. Moreover, the visualization apparatus 101 tracks when additional documents have been selected.

If the accesses include a selection of a category node, a concept, or an article, the visualization apparatus 101 modifies at least one of the category nodes and the tag cloud displayed in the graph displayed at step 212. Thus, for instance, if the user selects a category node, the visualization apparatus 101 may vary a graphical characteristic of the selected category node to denote that that category node has been selected.

However, if additional documents have been accessed, the visualization apparatus 101 is configured to repeat steps 204 to 212 based upon the additional documents. As such, for instance, the graph 400 may be continuously updated to include additionally accessed documents.

An example of an instance where the visualization apparatus 101 tracks a selection of lower-level category nodes is depicted in FIG. 4B. The graph 400 in FIG. 4B, more particularly, shows that a second level category node, "Culture", and a third level category node, "Sports", have been selected. As shown therein, when a lower level category node is selected, the category path is graphically denoted with a line connecting the upper level category node with the selected lower level category node. In addition, the selected category nodes are graphically distinguishable from the unselected category nodes. For instance, the unselected category nodes may be shown to have a shaded font style and the selected category nodes are depicted as having a larger and darker font size.

In addition, the concepts contained in the tag cloud 420 have changed in the graph 400 depicted in FIG. 4B as compared with the graph 400 depicted in FIG. 4A. More particularly, the concepts that are not relevant to the selected category nodes have been removed from the tag cloud 420. Thus, the concepts labeled "France" and "Great Britain" have been removed because they are not relevant to the category node labeled "Sports" or to the category node labeled "Basketball".

In addition, the graphical characteristics of the concepts contained in the tag cloud 420 have been modified based upon the relevance that each of the concepts has to the selected category nodes. As shown in FIG. 4B, the last category node selected is "Basketball". As such, the concepts most relevant to the category node "Basketball" are centered in the tag cloud 420 and have a larger font as compared with concepts pertaining to sports other than basketball.

Moreover, the articles list 430 has been modified to show the articles that are most relevant to the concepts depicted in the tag cloud 420. In addition, the articles depicted therein may comprise those articles that have most recently been accessed by the user.

Turning now to FIG. 4C, the concept "Los Angeles Lakers" is depicted as having been selected in the graph 400 as signified by its darker appearance as compared with the other concepts contained in the tag cloud 420. More particularly, as shown in FIG. 4C, the concepts in the tag cloud 420 other than "Los Angeles Lakers" have a gray or lighter appearance as compared with the "Los Angeles Lakers" concept. In addition, the articles list 430 may be modified to show only those articles relevant to the selected concept. Thus, selection of a different concept, such as, "New York Times" may result in the articles list 430 containing a different set of articles relevant to the "New York Times".

Although the hierarchy 410, the tag cloud 420, and the articles list 430 in the graph 400 have been depicted as having particular characteristics to distinguish some of the elements from each other, it should be understood that the elements may be caused to have other characteristics without departing from a scope of the invention. For instance, instead of the text of the category nodes and/or the concepts having different characteristics, additional distinguishing features, such as, symbols, graphs, etc., may be provided adjacent to the text, in which the additional distinguishing features may be configured to provide similar levels of differences between the text. In addition, the category nodes in the hierarchy 410 may also be depicted in one or more tag clouds, similar to the tag cloud 420.

Through implementation of the methods 200 and 300, the categories and concepts associated with a document access history may be visually represented, with the respective relevancies of the categories and concepts to the accessed documents. As such, "topics" may be revisited rather than the actual documents that are included in the document access history. In one regard, richer interaction with the documents in an access history as compared with conventional history tracking software is made available through implementation of the methods 200 and 300.

In addition, although the discussion above pertains to the visualization of category paths for use in browsing web documents, the same techniques are also applicable to other textual documents.

Some or all of the operations set forth in the methods 200 and 300 may be contained as utilities, programs, or subprograms, in any desired computer accessible medium. In addition, some or all of the methods 200 and 300 may be embodied by computer programs, which may exist in a variety of forms both active and inactive. For example, they may exist as software program(s) comprised of program instructions in source code, object code, executable code or other formats. Any of the above may be embodied on a computer readable medium.

Exemplary computer readable storage devices include conventional computer system random access memory (RAM), read only memory (ROM), electrically programmable read-only memory (EPROM), EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
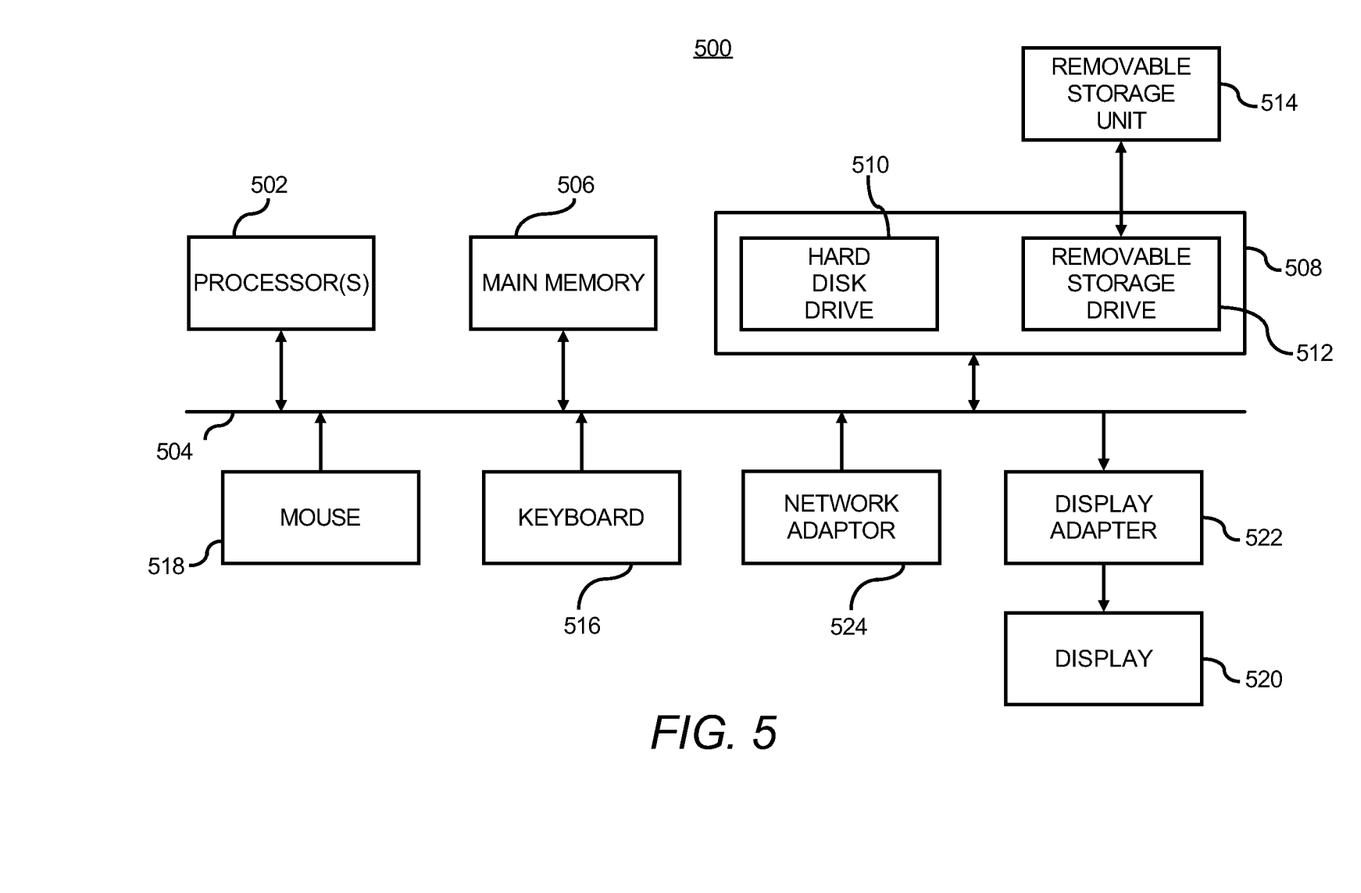
FIG. 5 shows a block diagram of a computing apparatus configured to implement one or more of the methods discussed with respect to FIGS. 2 and 3, according to an example embodiment of the invention.

FIG. 5 illustrates a block diagram of a computing apparatus 500, such as the visualization system 100 depicted in FIG. 1, according to an example. In this respect, the computing apparatus 500 may be used as a platform for executing one or more of the functions described hereinabove with respect to the visualization system 100.

The computing apparatus 500 includes one or more processors 502. The processor(s) 502 may be used to execute some or all of the steps described in the methods 200 and 300. Commands and data from the processor(s) 502 are communicated over a communication bus 504. The computing apparatus 500 also includes a main memory 506, such as a random access memory (RAM), where the program code for the processor(s) 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the methods 200 and 300 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor(s) 502 and convert the display data into display commands for the display 520. In addition, the processor(s) 402 may communicate over a network, for instance, the Internet, a local area network (LAN), etc., through a network adaptor 524.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of visually representing a hierarchy of category nodes, said method comprising:
   in a computing device, tracking access by a user to a document containing text;
   comparing, by a processor, the text contained in the accessed document with text contained in articles in a labeled text data source;
   determining, by the processor, in the labeled text data source, a subset of the articles that contain text that is similar to the text of the accessed document, wherein the articles in the labeled text data source are each assigned with one or more concepts relevant to text of the article;
   determining, by the processor, one or more concepts relevant to the accessed document to be the one or more concepts assigned to the determined subset of articles in the labeled text data source;
   determining one or more category paths through the hierarchy of category nodes for the one or more concepts relevant to the accessed document, wherein each of the one or more category paths is weighted according to a relevance between the one or more category paths and respective ones of the one or more concepts relevant to the accessed document;
   determining relevance levels for the category nodes with respect to the one or more concepts relevant to the accessed document based upon the one or more category paths;
   constructing a graph depicting a visual representation of the relevance levels determined for each of the category nodes in the hierarchy of category nodes;
   generating a visual representation of the one or more concepts relevant to the accessed document, wherein the visual representation of the one or more concepts relevant to the accessed document graphically depicts at least one distinguishing characteristic associated with the tracked access to the document and depicts those category paths that have been generated for the one or more concepts relevant to the document that have been accessed while omitting concepts relevant to documents that have not been accessed; and
   displaying the category nodes linearly according to their hierarchy level in the visual representation of the relevance levels, wherein a line connects a selected category node in one hierarchy level with another selected category node in a lower hierarchy level, wherein the visual representation of the relevance levels includes a tag cloud containing the one or more concepts relevant to the accessed documents arranged linearly with the category nodes, and wherein the visual representation of the relevance levels further includes an articles list depicted below the category nodes.

2. The method according to claim 1, wherein an arrangement of the hierarchy of category nodes is based upon category and concept relationships defined in the labeled text data source.

3. The method according to claim 1, further comprising:
   setting each of the category nodes to an initial predetermined score; and
   assigning scores to each of the category nodes based upon the weights assigned to the one or more category paths for the one or more concepts relevant to the accessed document, wherein the scores correspond to the relevance levels of the category nodes to the one or more concepts relevant to the accessed document.

4. The method according to claim 1, wherein generating a visual representation of the one or more concepts relevant to the accessed document further comprises generating a tag cloud containing the one or more concepts relevant to the accessed document, wherein at least one of the one or more concepts relevant to the accessed document has at least one characteristic that distinguishes the at least one of the one or more concepts relevant to the accessed document from other ones of the one or more concepts relevant to the accessed document in the tag cloud.

5. The method according to claim 4, further comprising:
   tracking accesses to at least one of the graph and documents; and
   modifying at least one of the category nodes and the tag cloud contained in the graph based upon the accesses.

6. The method according to claim 5, wherein tracking the accesses further comprises receiving a selection of a category node displayed in the graph, said method further comprising:
modifying the tag cloud to only show concepts determined to be relevant to the selected category node.

7. The method according to claim 5, wherein tracking the accesses further comprises receiving a selection of a category node displayed in the graph, said method further comprising:
modifying a visual representation of one or more of the concepts relevant to the accessed document based upon a relevance level of the one or more of the concepts relevant to the accessed document to the selected category node.

8. The method according to claim 1, further comprising:
receiving a selection of at least one of a category node and a concept;
identifying one or more documents determined to be relevant to the one of the selected at least one of the category node and concept; and
displaying the identified one or more documents in addition to the graph.

9. An apparatus for visually representing a hierarchy of category nodes, said apparatus comprising:
a processor;
a memory on which is stored machine readable instructions that are to cause the processor to:
track access by a user to a document containing text;
compare the text contained in the accessed document with text contained in articles in a labeled text data source;
determine a subset of the articles in the labeled text data source that contain text that is similar to the text of the accessed document, wherein the articles in the labeled text data source are each assigned with one or more concepts relevant to the text of the article;
determine one or more concepts relevant to the accessed document to be the one or more concepts assigned to the determined subset of articles in the labeled text data source;
determine one or more category paths through the hierarchy of category nodes for the one or more concepts relevant to the accessed document, wherein each of the one or more category paths is weighted according to a relevance between the one or more category paths and respective ones of the one or more concepts relevant to the accessed document;
determine relevance levels for the category nodes with respect to the one or more concepts relevant to the accessed document based upon the determined one or more category paths;
construct a graph depicting a visual representation of the relevance levels determined for each of the category nodes in the hierarchy of category nodes;
generate a visual representation of the one or more concepts relevant to the accessed document, wherein the visual representation of the one or more concepts relevant to the accessed document graphically depicts at least one distinguishing characteristic associated with the tracked access to the document and depicts those category paths that have been generated for the one or more concepts relevant to the document that have been accessed while omitting concepts relevant to documents that have not been accessed; and
display the category nodes linearly according to their hierarchy level in the visual representation of the relevance levels, wherein a line connects a selected category node in one hierarchy level with another selected category node in a lower hierarchy level, wherein the visual representation of the relevance levels includes a tag cloud containing the one or more concepts relevant to the accessed documents arranged linearly with the category nodes, and wherein the visual representation of the relevance levels further includes an articles list depicted below the category nodes.

10. The apparatus according to claim 9, wherein an arrangement of the hierarchy of category nodes is based upon category and concept relationships defined in the labeled text data source.

11. The apparatus according to claim 9, wherein the machine readable instructions are further to cause the processor to set each of the category nodes to an initial predetermined score and to assign scores to each of the category nodes based upon the weights assigned to the one or more category paths for the one or more concepts relevant to the accessed document, wherein the scores correspond to the relevance levels of the category nodes to the one or more concepts relevant to the accessed document.

12. The apparatus according to claim 9, wherein the machine readable instructions are further to cause the processor to generate the tag cloud containing the one or more concepts relevant to the accessed document, wherein at least one of the one or more concepts relevant to the accessed document has at least one characteristic that distinguishes the at least one of the one or more concepts relevant to the accessed document from other ones of the one or more concepts in the tag cloud.

13. The apparatus according to claim 12, wherein the machine readable instructions are further to cause the processor to track accesses to at least one of the graph and documents and to modify at least one of the category nodes and the tag cloud contained in the graph based upon the accesses.

14. The apparatus according to claim 9, wherein the machine readable instructions are further to cause the processor to receive a selection of at least one of a category node and a concept, to identify one or more documents determined to be relevant to the one of the selected at least one of the category node and concept, and to display the identified one or more documents in addition to the graph.

15. A non-transitory computer readable storage medium on which is embedded machine readable instructions that when executed by a processor, cause the processor to:
track accesses by a user to documents containing text;
compare the text contained in the accessed documents with text contained in articles in a labeled text data source;
determine a subset of the articles in the labeled text data source that contain text that is similar to the text of the accessed documents, wherein each of the articles is assigned with one or more concepts relevant to the text of the article in the labeled text data source;
determine the one or more relevant concepts assigned to the determined subset of articles from the one or more relevant concepts;
determine one or more concepts relevant to the accessed documents to be the one or more concepts assigned to the determined subset of articles in the labeled text data source;
determine one or more category paths through the hierarchy of category nodes for the one or more concepts relevant to the accessed documents, wherein each of the one or more category paths is weighted according to a relevance between the one or more category paths and respective ones of the one or more concepts relevant to the accessed documents;

determine relevance levels for the category nodes with respect to the one or more concepts relevant to the accessed documents based upon the generated one or more category paths;

construct a graph depicting a visual representation of the relevance levels determined for each of the category nodes in the hierarchy of category nodes;

generate a visual representation of the one or more concepts relevant to the accessed documents, wherein the visual representation of the one or more concepts relevant to the accessed documents graphically depicts at least one distinguishing characteristic associated with the tracked accesses to the documents and depicts those category paths that have been generated for the one or more concepts relevant to the documents that have been accessed while omitting concepts relevant to documents that have not been accessed; and display the category nodes linearly according to their hierarchy level in the visual representation of the relevance levels, wherein a line connects a selected category node in one hierarchy level with another selected category node in a lower hierarchy level, wherein the visual representation of the relevance levels includes a tag cloud containing the one or more concepts relevant to the accessed documents arranged linearly with the category nodes, and wherein the visual representation of the relevance levels further includes an articles list depicted below the category nodes.

16. The computer readable storage medium according to claim 15, wherein said machine readable instructions are further to cause the processor to:

generate a visual representation of the one or more concepts relevant to the accessed documents, wherein the visual representation graphically depicts at least one distinguishing characteristic associated with the tracked accesses to the documents.

\* \* \* \* \*